United States Patent [19]

Fuller

[11] Patent Number: 4,835,875
[45] Date of Patent: Jun. 6, 1989

[54] CYLINDRICAL SUNDIAL WITH INSTALLATION INDICIA

[76] Inventor: George L. Fuller, 444 E. Park Dr., Spartanburg, S.C. 29302

[21] Appl. No.: 161,465

[22] Filed: Feb. 26, 1988

[51] Int. Cl.[4] .................. G01C 17/34; G01C 21/02; G04B 49/02
[52] U.S. Cl. ......................................... 33/270; 33/392
[58] Field of Search ............... 33/270, 271, 269, 268, 33/392

[56] References Cited

U.S. PATENT DOCUMENTS

| | | | |
|---|---|---|---|
| 281,527 | 7/1883 | Larsen | 33/270 |
| 1,584,194 | 5/1926 | Sautter | 33/271 |
| 4,028,813 | 6/1977 | Eldridge | 33/270 |
| 4,081,911 | 4/1978 | Eldridge | 33/270 |
| 4,237,611 | 12/1980 | Wurch et al. | 33/271 |
| 4,355,470 | 10/1982 | Doyle | 33/270 |
| 4,384,408 | 5/1983 | Bohlayer | 33/270 |

Primary Examiner—William D. Martin, Jr.

[57] ABSTRACT

A universal sundial which indicates watch time is constructed from a standard pipe section or cylinder with one end an elliptical plane at an angle to the axis of the cylinder preferably within approximately 15° of the latitude of the proposed site. The gnomon is a small sphere located at the center of the elliptical plane end. Time, sun declination, latitude, and meridian displacement indicia are all located on the inner surface of the cylinder by angular coordinates from the center of the gnomon. Two cylinder or two removably attachable overlays are required for indication of civil time for a full year. The sundial is set up by orienting it so the shadow of the gnomon indicates the correct time when the gnomon is in a vertical position over the site latitude and meridian or meridian displacement indicia.

4 Claims, 2 Drawing Sheets

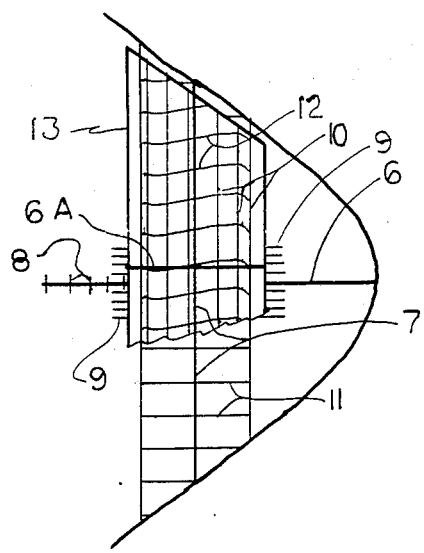
FIG. 4
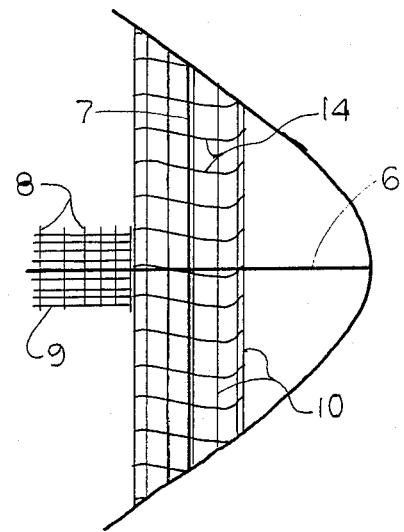
FIG. 5
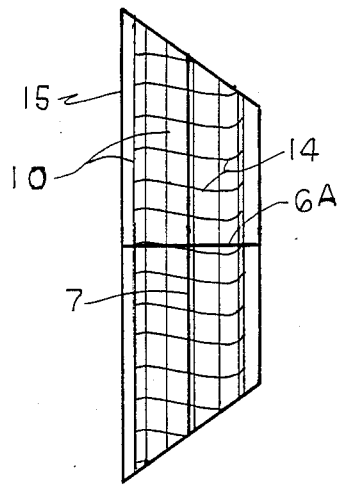
FIG. 6
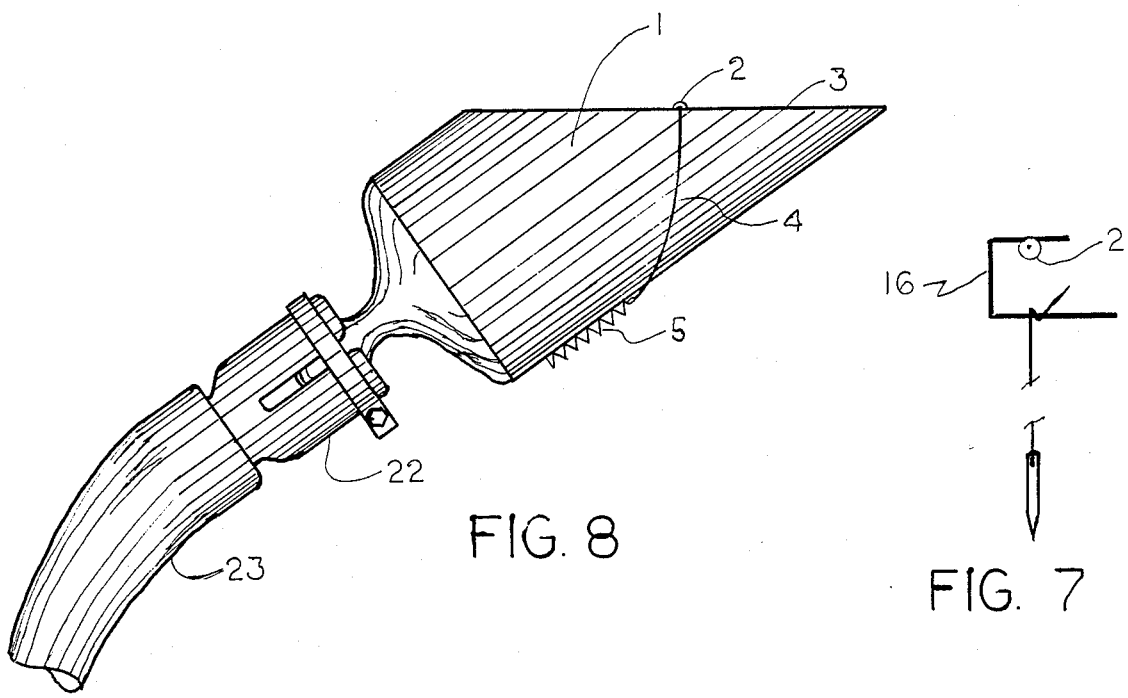
FIG. 8
FIG. 7

CYLINDRICAL SUNDIAL WITH INSTALLATION INDICIA

BACKGROUND OF THE INVENTION

1. Field of the Invention

The present invention is an improved sundial with improvements relating to versatility and ease of manufacture, installation and use.

2. Description of the Prior Art

Sundials indicating local apparent time have been used for thousands of years. Sundials indicating civil or mean time were invented by Christian in 1884 (U.S. Pat. No. 303,118) and by Crehore in 1905 (U.S. Pat. No. 794,787). These inventions used a bead or ball as a gnomon to make a symetrical shadow on a cylindrical surface with time lines corrected for the equation of time. No provision was made to correct for the difference between local and zone time.

To indicate zone time, a one minute time correction is required for each 15 minutes of longitude the site meridian is displaced from the time zone meridian. Recent inventions with corrections for the difference between local and zone time require extensive precise fabrication or casting, and expert installation adjustment and use. Some require custom manufacture for the site latitude. It has long been known that a proper sundial at one location can be set to indicate the correct time at a second location.

Also recently instruments have been developed for sighting the site "solar window" and determining the times the sun's rays will be obstructed at the site. These instruments have either been very complex or very general and inaccurate.

SUMMARY OF THE INVENTION

The object of the invention is to provide a simple, practical, and inexpensive universal sundial which can easily be set up by an average person and will indicate watch or civil zone time throughout the year without adjustment or manipulation.

The present invention is a simply constructed, installed, and read universal sundial especially appropriate for use in Temperate geographical zones. It will indicate civil zone time in the winter/spring half of the year or the summer/fall half of the year depending upon the civil time indicia used. It is constructed from a standard pipe section or cylinder, has a small sphere for a gnomon, and can be set up by use of a plumb line and second time piece. Once set up at the site and secured it needs no further adjustment if two sundial cylinders are used and only requires biannual exchange of overlays if only one cylinder is used.

When constructed with a transparent cylinder the present invention may be reverse sighted to determine the times the sun's rays will be obstructed at the site.

BRIEF DESCRIPTION OF THE DRAWINGS

FIG. 4 is a developed view taken in the direction 4—4 of FIG. 3.

FIG. 5 is a developed view of another embodiment taken in the direction 4—4 of FIG. 3.

FIG. 6 is a plan view of a removably attachable flexible overlay.

FIG. 7 is a side view of a portable plumb fixture with plumb bob installed on a gnomon.

FIG. 8 is a side view of another embodiment of the present invention.

DESCRIPTION OF THE PREFERRED EMBODIMENT

Figure 1:
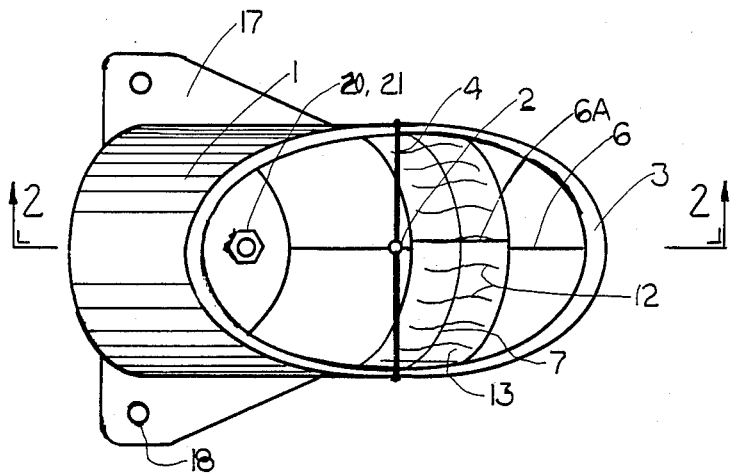
FIG. 1 is a top view of the preferred embodiment of the present invention.
Figure 3:
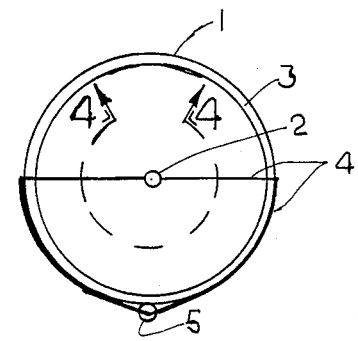
FIG. 3 is an end view taken along the line 3—3 of FIG. 2.

The present invention provides a sundial consisting essentially of a portion of a cylinder 1 and a small spherical gnomon 2.

Cylinder 1 has inside radius $r_1$ and one end 3 in a plane at an angle $\mu$ to the axis of cylinder 1. The value of $\mu$ is not critical but ideally should equal the latitude of the proposed site. For extreme northern and southern sites in the contiguous United States a $\mu=35°$ causes no loss of time indication for six months and only up to less than one hour of loss at the beginning and end of day at one of the solstices. Cylinder end 3 has the shape of an ellipse with minor axis $2r_1$, major axis $2r_1/\sin \mu$, and center on the axis of cylinder 1.

Gnomon 2 is a small sphere with diameter $d_2$ equal approximately to $r_1/25$ and is fixed to cord or wire or line 4. Cord or wire or line 4 passes through the center of gnomon 2 and holds gnomon 2 at the center of the elliptical plane end 3. Spring 5 maintains sufficient tension in code or wire or line 4 to keep gnomon 2 in place and still allow adjustment if needed.

Line 6 is a longitudinal line of the lower inside surface of cylinder 1 in a plane also containing the axis of cylinder 1, the major axis of elliptical plane end 3, and the center of gnomon 2. Line 7 is a circumferential line on the inside surface of cylinder 1 in a plane at right angles to the axis of cylinder 1 containing the minor axis of elliptical plane end 3 and the center of gnomon 2.

When the axis of cylinder 1 is parallel to the axis of the earth, circumferential line 7 will be in a plane parallel to the earth's equator and the celestial equator. Also when the axis of cylinder 1 is parallel to the axis of the earth at the same time a vertical line from gnomon 2 intersects longitudinal line 6, longitudinal line 6 will be in the same plane as the meridian of the site and the angle at gnomon 2 between said vertical line and the plane of circumferential line 7 will equal the latitude of the site.

Latitude indicia lines 8 are located parallel to circumferential line 7 a distance from circumferential line 7 of $r_1 \times$ tan. degrees of latitude. Meridian displacement indicia lines 9 are located parallel to longitudinal line 6 a distance from longitudinal line 6 of $\pi r_1/180° \times$ degrees of meridian displacement. Meridian displacement for purposes of the sundial is the difference between the longitude of the site and the longitude of the time zone meridian.

When the sundial is set up at the site with the axis of cylinder 1 parallel to the axis of the earth and when sun declination equals zero, the shadow of gnomon 2 from the sun will be on circumferential line 7. As the declination of the sun varies between solstices from 23.44° north about June 22 to 23.44° south about Decemeber 22, the shadow of the gnomon will vary in the opposite direction on a line parallel to circumferential line 7 a distance from circumferential line 7 equal to $r_1 \times$ tan. degrees sun declination. Sun declination lines 10 represent approximate sun declination at the solstices and first of months.

With the sundial set up with the axis of cylinder 1 parallel to the axis of the earth and with longitudinal line 6 and gnomon 2 in a vertical plane, when it is 12 o'clock noon apparent local time the shadow of gnomon 2 from the sun will be on longitudinal line 6. During the day as the sun moves east to west, the shadow of the gnomon moves west to east. Apparent local time indicia lines 11 for hours of the day and fractions of hours are parallel to longitudinal line 6 a distance from longitudinal line 6 of $\pi r_1/12 \times$ hours before or after 12 o'clock noon apparent local time.

To set up the sundial to indicate apparent local time the cylinder is positioned so the center of gnomon 2 is vertically above the intersection of site latitude indicium line 8 and longitudinal line 6 at the same time the shadow of gnomon 2 indicates the correct apparent local time.

For the sundial to indicate civil zone time two corrections are necessary—first a correction for the difference between apparent time and civil time, and second a correction for the difference between local time and zone time.

To correct for the difference between apparent time and civil time, the time lines must incorporate the equation of time correction for the particular sun declination. As the equation of time and sun declination relationship for dates in the winter/spring half of the year are not the same as for dates in the summer/fall half of the year, two sets of civil time indicia are required. In the preferred embodiment civil time indicia lines 12 for the first half of the year are located on overlay 13 and civil time indicia lines 14 for the second half of the year are located on overlay 15.

Overlays 13 and 15 are thin flexible sheets of thickness $t_0$ which are alternately attached to and removed from the inside surface of cylinder 1. Overlays 13 and 15 when in place have inside radius $r_0 = r_1 - t_0$. Both overlays 13 and 15 have longitudinal line 6A as a time base to represent 12 o'clock noon apparent time and circumferential line 7 as a sun declination base.

The 12 o'clock noon civil time indicium line 12 or 14 is calculated first. Additional civil time indicia lines 12 or 14 for hours and fractions of an hour are parallel to the 12 o'clock noon civil time indicium line 12 or 14 and are located before or after the 12 o'clock noon civil time indicium line 12 or 14 a distance $\pi r_0/12 \times$ hours before or after 12 o'clock noon.

An example of calculations for a point on the 12 o'clock noon civil time indicium line 14 is as follows: from a Solar Ephemeris on October 31 the sun declination is south 14.0° and the equation of time is plus 16.3 minutes; therefore the point is north of circumferential line 7 a distance of $r_0 \times \tan. 14.0°$ and after longitudinal line 6A a distance of $\pi r_0/720 \times 16.3$.

To correct for the difference between local time and zone time in the preferred embodiment, overlay 13 or 15 for the current half year is installed so that the 12 o'clock noon apparent time indicium line 6A is aligned with meridian displacement indicium line 9 for the site and circumferential line 7 on overlay 13 or 15 is aligned with circumferential line 7 inside cylinder 1.

The preferred means of plumbing the gnomon over the desired indicia is with a plumb bob and plumb line. For larger sundials a small hole is drilled through the center of gnomon 2 for the plumb line. For smaller sundials portable plumb fixture 16 is placed temporarily on gnomon 2 for the plumb line and plumb bob. Another means of plumbing is by use of an optical plumbing instrument.

Figure 2:
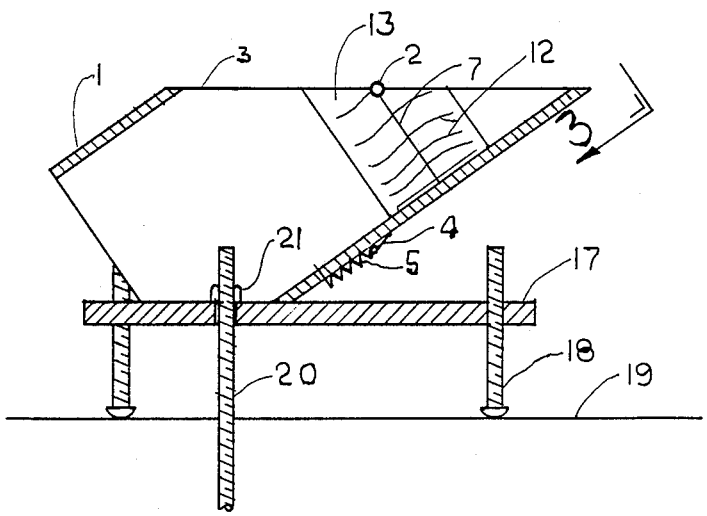
FIG. 2 is a sectional view taken along the line 2—2 of FIG. 1.

In the preferred embodiment shown in FIG. 1 and FIG. 2, base 17 is fixed to the lower part of cylinder 1 approximately parallel to elliptical plane end 3. Three adjusting bolts 18 are threaded through base 17 and bear on the top surface of stationary support 19. One hold down bolt 20 projects above the top surface of stationary support 19 and passes through base 17. When nut 21 is loose on hold down bolt 20 the sundial may be rotated about a vertical axis through hold down bolt 20 and when nut 21 is tight the sundial is held firmly in position.

To set up the preferred embodiment, first gnomon 2 is plumbed directly above the point of intersection of longitudinal line 6 and site latitude indicium line 8. This is done with plumb fixture 16 and by turning adjusting bolts 18 bearing on stationary support 19 as necessary. Next the sundial is rotated about hold down bolt 20 until the correct time is indicated by the shadow of the gnomon on applicable overlay 13 or 15. The sundial is then secured by tightening nut 21 on hold down bolt 20. No further adjustments are required except for biannual exchange of overlays 13 and 15.

In another embodiment the two removably attachable flexible overlays 13 and 15 are eliminated and two half year sundials are used. One sundial cylinder 1 has civil time indicia lines 12 for the winter/spring half year and the other has civil time indicia lines 14 for the summer/fall half year. FIG. 5 illustrates this embodiment for a summer/fall half year sundial. In this embodiment longitudinal line 6 is the 12 o'clock noon apparent time indicium. To set up this embodiment gnomon 2 is plumbed over the intersection of site latitude indicium line 8 and meridian displacement indicium line 9— thereby putting longitudinal line 6 and the gnomon in a plane parallel to the time zone meridian when the sundial is oriented. Longitudinal line 6 then represents 12 o'clock noon apparent zone time.

Another embodiment of the present invention shown in FIG. 8 has a ball joint 22 to facilitate setting up and securing the sundial. One part of ball joint 22 is fixed to cylinder 1 and the other part is fixed to a stationary rod or pipe 23. Ball joint 22 is loosened to allow plumbing the gnomon over the desired indicia and rotating the sundial about a vertical axis through the ball until the correct time is indicated by the shadow of gnomon 2. Ball joint 22 is then tightened to secure the sundial in position.

In another embodiment of the present invention, the sundial is secured by simply embedding it in earth or concrete or other castable material, with or without provisions for plumbing and orientation after embedment.

Some embodiments of the present invention can be used as instruments to predetermine the position of the sun at various times of the day and months of the year by making cylinder 1 transparent. After setting up and securing the sundial the line of sight from the gnomon through sun declination indicia lines 10 and hour indicia lines 11 or 12 or 14 will establish the location of the sun for that particular hour of the day and declination of the sun.

I claim:
1. A cylindrical sundial comprising:
   (a) a hollow right cylinder with one end in the form of an ellipse in a plane inclined about 35° to the axis of the cylinder, with a longitudinal index line on the inner surface of said cylinder in the plane also containing the axis of said cylinder and the major axis of the elliptical end, and with a circumferential index line on the inner surface of said cylinder in a plane at right angles to the axis of said cylinder and also containing the minor axis of the elliptical end:

(b) a spherical gnomon with means to adjust and secure said gnomon at the point where the axis of said cylinder intersects the plane containing said circumferential index line;

(c) latitude indicia lines on the inner surface of said cylinder with said circumferential index line a basis, representing zero latitude—such that when a vertical line from the center of the gnomon intersects the latitude indicium line representing the latitude of the site, the axis of said cylinder will be inclined to the horizontal at an angle equal to the degrees latitude of the site;

(d) Longitude displacement indicia lines on the inner surface of said cylinder with said longitudinal index line a basis, representing zero longitude displacement—such that when a vertical line from the center of the gnomon intersects the longitude displacement indicium line for the site, the plane containing the axis of said cylinder and said longitudinal index line will be inclined to a vertical plane through the axis of the cylinder at an angle equal to the difference between the longitude of the site meridian and the longitude of the time zone meridian; and (e) time indicia lines on the inner surface of said cylinder with said circumferential index line a basis representing zero sun declination, and with said longitudinal index line a basis representing 12 o'clock noon apparent zone time—such that when the gnomon is vertically above the site longitude displacement indicium line and the axis of the cylinder is parallel to the axis of the earth, the correct zone time will be indicated by the shadow of the gnomon from the sun;

2. A sundial as set forth in claim 1 further comprising;

(a) means to adjust the attitude of the sundial such that a vertical line from the center of the gnomon will intersect both the latitude indicium line representing the latitude of the site and the longitude displacement indicium line representing the degrees the longitude of the site meridian is displaced from the longitude of the standard time zone meridian;

(b) means to adjust the orientation of the sundial after adjusting the attitude, by rotating the sundial about a vertical axis until the correct zone time is indicated by the shadow of the gnomon from the sun; and (c) means to secure the sundial in said attitude and said orientation such that the shadow of the gnomon from the sun will continuously indicate the correct zone time.

3. A sundial as set forth in claim 1 further comprising a removably attachable, flexible overlay with circumferential index line, longitudinal index line, and time indicia for the six month period from the winter solstice to the summer solstice, on one side, and with circumferential index line, longitudinal index line, and time indicia for the six month period from the summer solstice to the winter solstice, on the other side.

4. A sundial as set forth in claim 1 wherein the cylinder is made of a transparent material such that by sighting upward through the wall of the cylinder, the "solar window" can be determined by aligning the gnomon with time and sun declination or month indicia.

* * * * *